July 5, 1955 — J. K. LUND — Re. 24,255 / 2,712,324
FLUID MIXING VALVE
Filed June 5, 1951 — 3 Sheets-Sheet 1
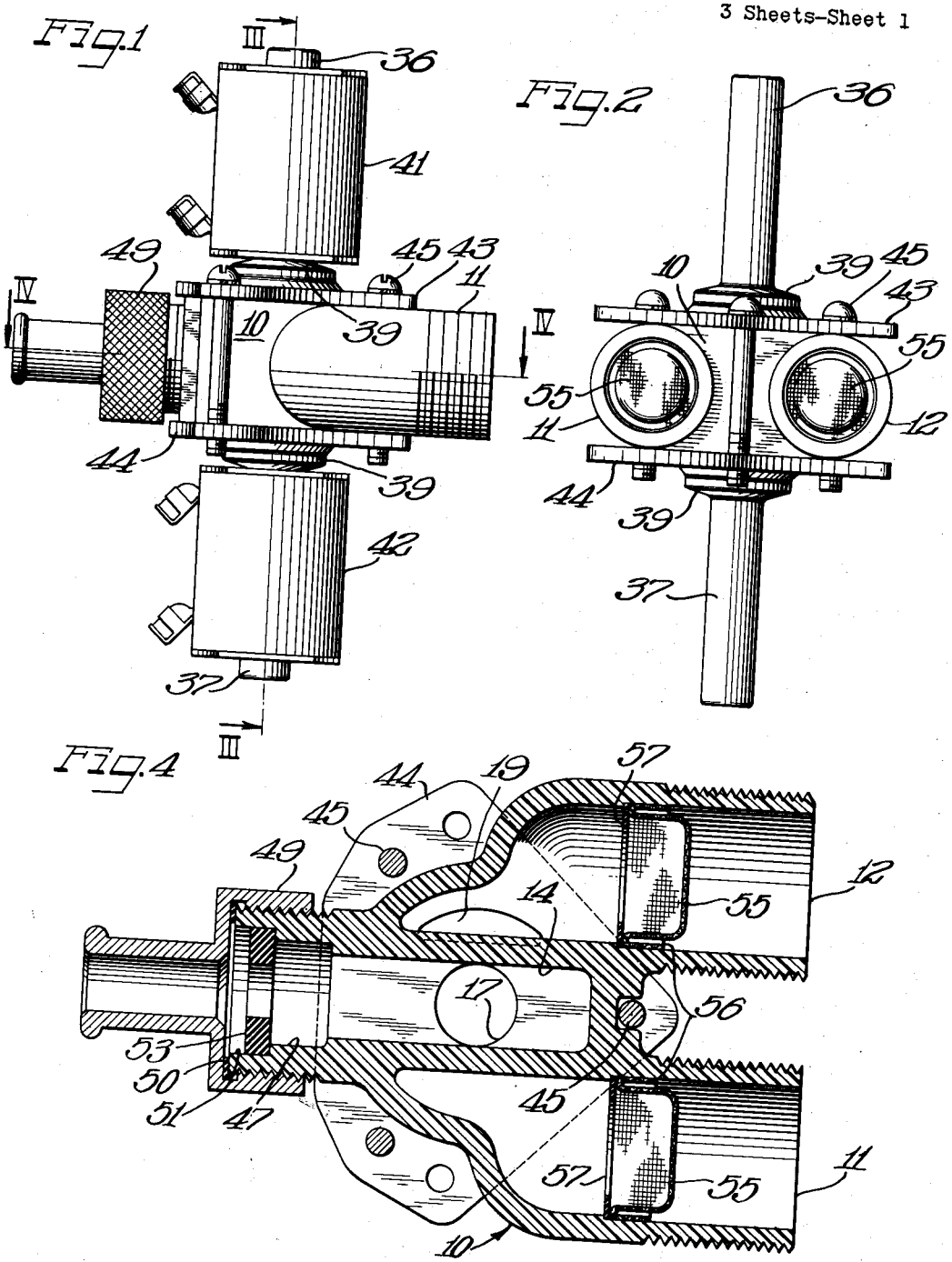
Inventor: James K. Lund
by Hill, Sherman, Meroni, Gross & Simpson
Attys July 5, 1955　　　　　　　　J. K. LUND　　　　　2,712,324
FLUID MIXING VALVE
Filed June 5, 1951　　　　　　　　　　　　　　　3 Sheets-Sheet 2

Inventor:
James K. Lund
by [signature] Attys

July 5, 1955

J. K. LUND 2,712,324

FLUID MIXING VALVE

Filed June 5, 1951

Inventor:
James K. Lund
by Hill, Sherman, Meroni, Gross & Simpson Attys

United States Patent Office 2,712,324
Patented July 5, 1955

2,712,324
FLUID MIXING VALVE

James K. Lund, Oak Park, Ill., assignor to The Dole Valve Company, Chicago, Ill., a corporation of Illinois Application June 5, 1951, Serial No. 229,983

5 Claims. (Cl. 137—606)

This invention relates to improvements in fluid mixing valves for delivering hot or cold water, or for mixing the hot and cold water and delivering it at intermediate temperatures.

My invention has as one of its principal objects to provide a new and improved fluid mixing valve arranged with a view toward utmost simplicity and compactness in structure and operation.

A further object of my invention is to provide a novel form of mixing valve, constructed and arranged to simplify the manufacture of the valve, by making the valve body of a one-piece construction and by eliminating the need for inserts, to form the passageways and seats of the valve.

Still another object of my invention is to provide a new and improved mixing valve including an integral open ended valve body having valve means closing the ends of the body and controlling the flow of hot and cold liquids into the body through the open ends thereof, with a central passageway leading from the body, and spaced inlets on opposite sides of the central passageway, one of which communicates with the central passageway through one open end of the valve body, and the other of which communicates with the central passageway through the other open end thereof.

A still further object of my invention is to provide a novel form of mixing valve, for mixing hot and cold water and delivering hot or cold water, or mixed hot and cold water at an intermediate temperature, wherein the hot and cold inlets of the valve body enter the body from one side thereof and the outlet from the valve body is from the opposite side thereof, one inlet communicating with one end of the body and the other inlet communicating with the other end of the body; and wherein fluid pressure operated valve means close opposite ends of the valve body and with the valve body form chambers for passing the fluid from the respective inlets to the central opening through the valve body for contact and mixture in opposed directions.

These and other objects of my invention will appear from time to time as the following specification proceeds and with reference to the accompanying drawings, wherein:

Figure 1 is a view in side elevation of a solenoid operated fluid mixing valve constructed in accordance with my invention;

Figure 2 is an end view of the valve shown in Figure 1 with the solenoid coils for controlling operation of the valve removed;

Figure 4 is a horizontal sectional view taken substantially along lines IV—IV of Figure 1;

Figure 5:
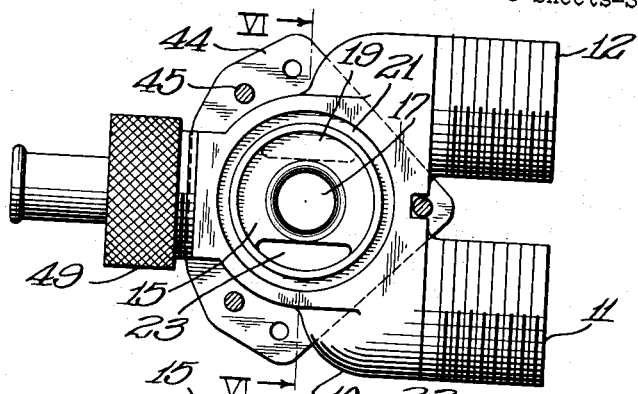
Figure 5 is a top plan view of the valve, with the upper solenoid and pressure operated valve removed.
Figure 6:
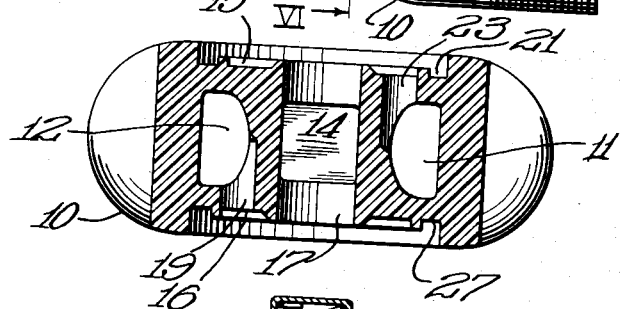
Figure 6 is a fragmentary vertical sectional view taken substantially along lines VI—VI of Figure 5.
Figure 3:
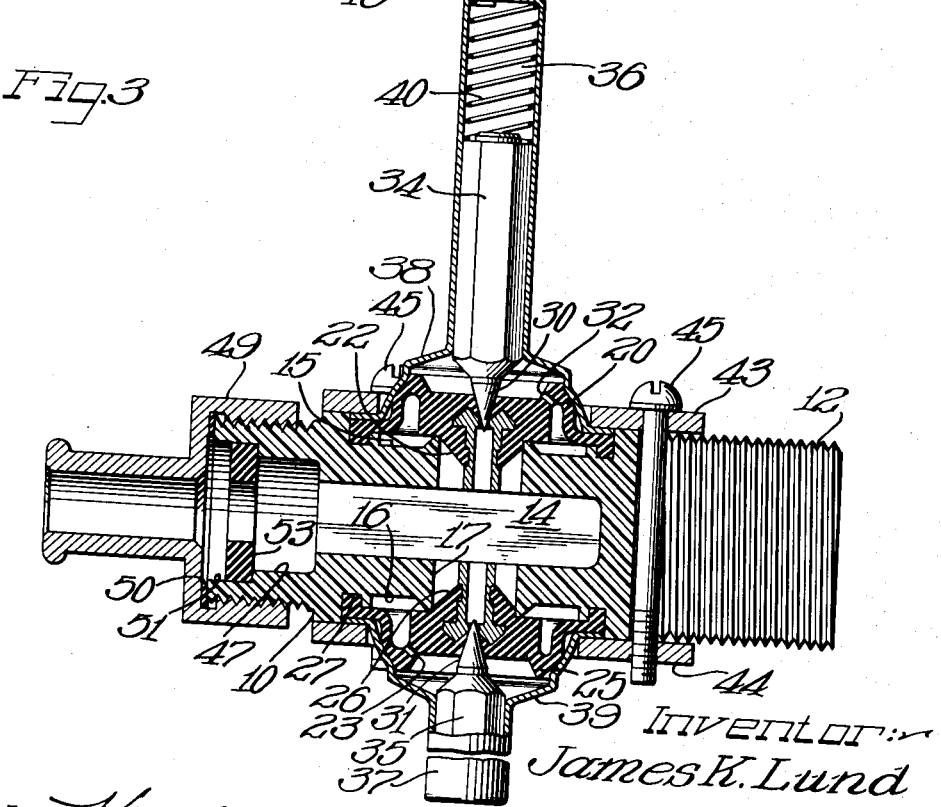
Figure 3 is a fragmentary vertical sectional view taken longitudinally through the center of the valve, with the solenoid coils for controlling operation of the valve removed.

In the embodiment of my invention illustrated in Figures 1 through 6 of the drawings, the valve is shown as comprising a valve body 10, which may be cast or molded from one of the well known thermoplastic materials, and then drilled and machined as required.

The valve body 10 has a hot water inlet 11 entering said valve body along one side thereof and a laterally spaced cold water inlet 12 entering said valve body along the opposite side thereof. The laterally spaced inlets 11 and 12 communicate with the hollow interior of said valve body and are separated by the side walls of a mixing chamber 14. The mixing chamber 14 is in the form of a central passageway extending along said valve body and opening from the opposite end of said valve body from said hot and cold water inlets. The valve body 10 is also shown as having two vertically spaced faces or walls 15 and 16 opening to the upper and lower ends thereof, and connected together by a central passageway 17 extending vertically through said valve body and opening to the upper and lower ends thereof and intersecting the mixing chamber 14.

A vertical passageway 23 is herein shown as extending upwardly from the inlet 11 through the annular face or wall 15 and as forming a flow passageway to the inside of a diaphragm 20, seated at its periphery in a recess 21 at the outer margins of the wall or upper face 15, and having a central valve 22, to close or open the upper end of the vertical passageway 17 for the flow of hot water into the mixing chamber 14 through the passageway 23 leading through the wall 15 of the valve body.

A passageway 19 is herein shown as leading downwardly from the cold water inlet 12 and opening through the annular face or wall 16 to the inside of a diaphragm 25, having an inwardly extending central valve 26, to open or close the lower end of the central passageway 17, for the flow of cold water into the mixing chamber 14 from the cold water inlet 12. The diaphragm 25 is seated at its periphery in an annular recess 27 forming the outer margin of the bottom face 16 of the valve body.

The diaphragms 20 and 25 and integrally formed valves 22 and 26 thereof are herein shown as being pressure operated diaphragm valves of a well known form, having central apertures extending therethrough closed by valves 30 and 31, respectively, to maintain the valves closed by pressure entering diaphragm chambers on the outer sides of said diaphragms through bleeder passageways 32 and 33 in said respective diaphragms. The valves 30 and 31, are shown as being formed integrally with the inner ends of plungers 34 and 35 respectively slidably guided in guide stems 36 and 37. The guide stems 36 and 37 are herein shown as being formed integrally with and extending outwardly from caps 38 and 39 respectively. The caps 38 and 39 engage the outer surfaces of the respective diaphragms 20 and 25, adjacent their edges and with said diaphragms, form the outer diaphragm chambers of the valves. A spring 40 is shown as yieldably maintaining the valve 30 in position to block the passage of fluid through the central aperture in the diaphragm 20. A similar spring (not shown) is provided to urge the valve 31 into position to block the flow of fluid through the central passageway in the diaphragm 25 to maintain the valve 26 closed.

The plungers 34 and 35 form armatures of solenoids 41 and 42, the coils of which encircle the stems 36 and 37 and are suitably mounted thereon. The caps 38 and 39 are shown as being maintained in fluid tight engagement with the outsides of the respective diaphragms 20 and 25 by means of the yokes 43 and 44, engaging the edges of the respective caps 38 and 39, and clamped thereto by means of machine screws 45, 45 extending through the yoke 43 and, shown as being threaded within the yoke 44.

Upon the energization of either one of the solenoids 41 and 42, the respective valve will open, allowing fluid to pass through the central passageway in the respective diaphragm, and reduce the fluid pressure on the outer sides of the respective diaphragm, thus allowing the pressure on the inner sides of said diaphragm to move the respective valve to an open position, for the free flow of fluid through the central vertical passage 18 into the mixing chamber 14.

The mixing chamber 14 terminates into an outlet 47 forming a continuation of the passageway 14. The outlet 47 is externally threaded and is shown as having a stepped fitting 49 threaded thereon. A washer or gasket 50 abuts the end of said outlet and engages the stepped portion of the fitting 49, to prevent the leakage of fluid past the threads of said fitting. The outlet 47 has a shouldered portion 51, of increased diameter, within which is slidably mounted a flexible flow control washer 53. The flow control washer 53 may be made from rubber or an elastomer, and upon the passage of fluid under pressure through the outlet 47, is engaged with the inner face of the stepped fitting 49, and deforms to enlarge or reduce the delivery area of the orifice therethrough, as in Patent No. 2,454,929, which issued to Leslie A. Kempton on November 30, 1948. The flow control washer 53 may be varied to give the desired delivery pressure and volume of fluid delivered from the valve, and besides regulating the pressure and volume of the fluid delivered by the valve also sets up a back pressure in the mixing chamber 14 and on the diaphragm valves 22 and 26 to prevent chattering thereof.

The inlets 11 and 12 each have a strainer 55 therein. The strainers 55, 55 are shown as being of a hat-like form, having backwardly turned rims 56, 56 engaging the bores of the respective inlets. The rims 56, 56 abut washers 57, 57, engaging inner shouldered portions of the passageways 11 and 12 and limiting inward movement of the respective strainers. Check valves (not shown) may also be provided in said passageways if desired.

A simplified and improved valve and valve body structure has thus been provided, wherein the machining operations are very much simplified over former mixing valves, and wherein the cold water enters the mixing chamber from the bottom and the hot water enters the mixing chamber in an opposing direction from the top thereof, assuring a uniform mixture and delivery of a tempered water. It may further be seen that the valve body is of a one piece construction which may readily be made from a thermal-plastic material, and also requires a minimum amount of space, making it suitable for controlling the supply of hot, cold or tempered water in predetermined cycles for automatic washing machines.

Figure 7:
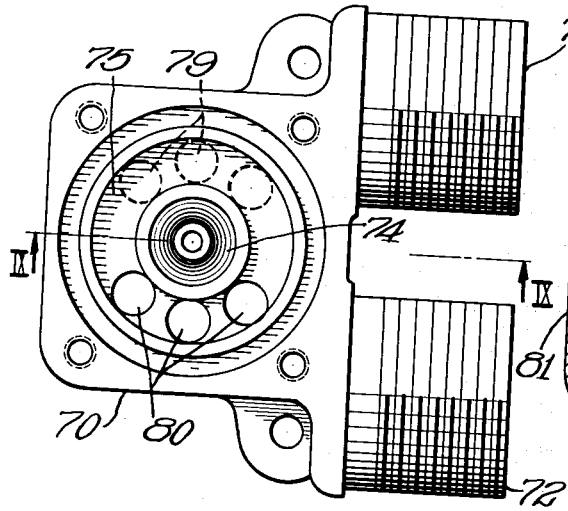
Figure 7 is a plan view of a modified form of valve body which may be constructed in accordance with my invention.
Figure 8:
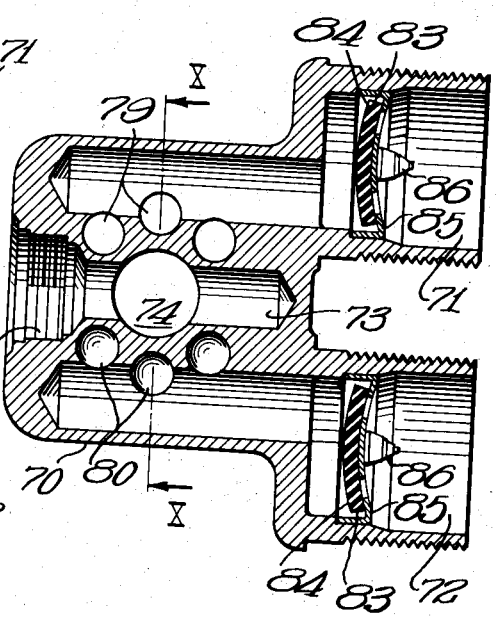
Figure 8 is a horizontal sectional view taken through the valve body shown in Figure 7.
Figure 9:
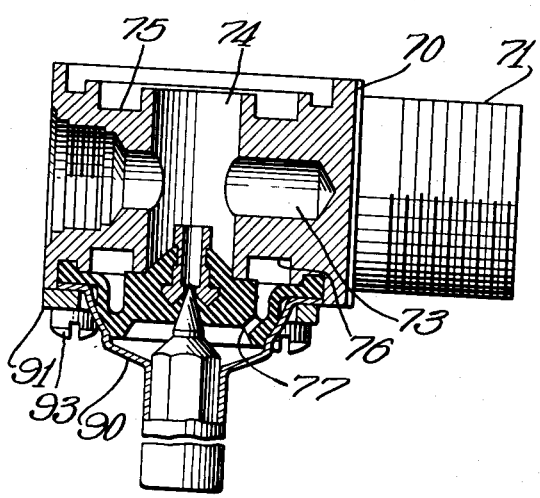
Figure 9 is a vertical sectional view taken substantially along lines IX—IX of Figure 7 and showing a solenoid controlled pressure operated valve depending from the lower end of the valve body.
Figure 10:
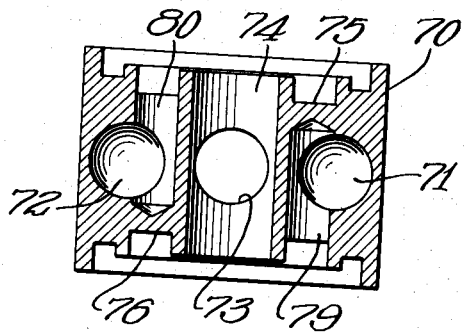
Figure 10 is a vertical sectional view taken substantially along the lines X—X of Figure 8.

In the form of my invention shown in Figures 7, 8, 9 and 10, I have shown a mixing valve constructed on principles similar to the valve shown in Figures 1 through 6, but more particularly adapted to be constructed from brass, bronze, or any other suitable metal, and preferably from an extruded bronze bar, extruded into the general valve body shape desired, and then drilled and machined as required.

In this form of my invention, a valve body 70 is shown as having a hot water inlet 71 and a cold water inlet 72 leading into the valve body on opposite sides of a mixing chamber 73 extending therealong and opening from the opposite side of said valve body from said inlets. A vertical passage 74, which may be drilled through the valve body from the upper to the lower ends thereof, intersects the mixing chamber 73 at right angles with respect thereto and opens to opposite ends of said valve body.

The valve body 70 is provided with opposite end walls or faces 75 and 76, the inner margins of which define the central passage 74 and form seats for pressure operated solenoid controlled diaphragm valves 77, 77. One only of said diaphragm valves is herein shown and said valves may be like those shown in the form of my invention illustrated in Figures 1 through 6, so a detailed description thereof need not herein be repeated.

The hot water inlet passage 71 communicates with its associated diaphragm valve 77 through a plurality of drilled passageways 79, 79 drilled from the face or wall 76 and intersecting said inlet passage. The cold water inlet passage 72 communicates with the opposite diaphragm valve through drilled passageways 80, 80 drilled from the opposite face or wall 75 of the valve body. When the respective pressure operated valve 77 is open, water will pass from the inlet passageway 71, through the drilled passageways 79 into the central passageway 74 to the mixing chamber 73 from the bottom thereof, and out through a discharge outlet 81 thereof. In a like manner cold water will enter the cold water passageway or inlet 72 and pass through the passageway 80, 80 downwardly into the central passageway 74 and enter the mixing chamber 73 in an opposing direction from the hot water, for uniform mixture with the hot water.

Check valves 83, 83 may be provided in the passageways 71 and 72 to prevent the back flow of water from the mixing chamber 73 when the respective valves 77, 77 are open. The check valves 83, 83 are each herein shown as being of a wafer type of check valve including a flexible wafer 84 made from rubber or an elastomer and mounted in a cage 85. Said cages are seated in the respective inlet passageways 71 and 72 and are shown as being of an inverted cylindrical form having an arcuate bottom extending within the wall of said cage. Each wafer 84 is herein shown as abutting the inwardly extending convex face of the cage 85, and as being held in engagement therewith by back pressure of the liquid. The wafer 84 is retained to its cage by nibs 86, 86 extending through apertured portions of said cages. The cages 85, 85 are also apertured, to permit the passage of water therethrough, by flexing the wafer 84 in a direction away from the convex face of its respective cage. Strainers like the strainers 55, 55 may be provided in the inlets 71 and 72, to strain the incoming water if desired.

The outlet passage 81 may have a suitable fitting (not shown) threaded therein, having a flow control washer (not shown) like the flow control washer 53, mounted therein to control the volume and pressure of the water delivered by the valve, as in the form of my invention shown in Figure 1.

It may be seen that in this form of my invention the valve body may readily be formed from a casting or an extruded metal shape and that all of the passageways therein may be formed by simple drilling operations with a minimum amount of machining.

It will be understood that modifications and variations may be effected without departing from the scope of the novel concepts of the present invention.

I claim as my invention:

1. A valve body comprising a hollow body part having two aligned spaced recessed outwardly facing annular wall portions, a central passageway through said wall portions, opening to opposite sides of said valve body, the hollow part of said valve body defining a mixing chamber extending therealong parallel to said wall portions and intersecting said central passageway, an outlet from said valve body from one end of said mixing chamber, two spaced inlets leading into said valve body into the opposite end thereof from said outlet and extending along said body on opposite sides of said mixing chamber and parallel thereto, and separated therefrom by the walls of said passageway, and fluid passageways extending generally parallel to said central passageway for the flow of fluid from said inlets into said mixing chamber in opposed directions, including a fluid passageway from one of said inlets through one of said wall portions and another fluid passageway from the other of said inlets through the other of said wall portions.

2. In a mixing valve, a valve body having axially aligned annular recessed portions facing opposite ends thereof and having a passageway extending through said valve body from one recessed portion to the other, and connecting said annular recessed portions together, a central chamber extending along said valve body perpendicularly to and intersecting said passageway and defining a mixing chamber opening directly from said valve body through a wall thereof perpendicular to the walls of said recessed portions, two spaced inlets into said valve body and extending therealong on opposite sides of said mixing chamber and separated therefrom by the walls thereof, a flow passageway leading from one of said inlets to one of said annular recessed portions, a second flow passageway leading from the other of said inlets in an opposite direction from said first flow passageway to the other recessed portion of said valve body, and pressure operated valve means in said annular recessed portion of said valve body operated by the pressure of fluid in said flow passageways and enclosing the ends of said flow passageways and controlling the flow of fluid from said inlet passageways into said mixing chamber.

3. In a mixing valve comprising a valve body having a central passageway leading therethrough and opening to opposite sides thereof, said valve body having two spaced recessed portions having annular walls encircling said central passageway and defining the outer margins thereof and facing opposite ends of said valve body, flexible diaphragms sealed to said walls and forming pressure operated valves, operable to close the ends of said central passage, solenoid operated means operable to control operation of said valves, a mixing chamber within said valve body between said valves and extending perpendicular to and intersecting said central passageway, an outlet from said mixing chamber and valve body in the space between said valves, two spaced inlets leading into said valve body along opposite sides of said mixing chamber, a flow passageway from one of said inlets leading perpendicularly therefrom and communicating with the inside of an associated diaphragm for operating the same to open the associated valve, a flow passageway from the other of said inlets through the other of said spaced walls and leading from said inlet in an opposite direction from said first flow passageway and communicating with the inside of the other of said diaphragms for operating the same to open the associated valve, and said diaphragms confining the flow of water from said flow passageways to said central passageway for mixture in said mixing chamber in opposing directions when the two valves associated therewith are open.

4. A mixing valve comprising a central valve body having a pair of inlet passageways and an outlet passageway extending therefrom, the longitudinal axes of all three passageways lying parallel to each other, said central body having three communicating ducts lying substantially at right angles to said passageways, one of said ducts intersecting said outlet passageway and leading entirely through said valve body and opening to opposite ends thereof, another of said ducts leading in one direction from one of said inlet passageways to one open end of said valve body, the third of said ducts leading in an opposite direction from the other inlet passageway to the other open end of said valve body, and valve means for closing the open ends of said first duct and confining the flow of fluid from said second and third ducts to said one duct when the valves are opened.

5. A mixing valve comprising a valve body having a pair of inlet passageways and an outlet passageway extending therefrom, the longitudinal axes of all three passageways lying substantially in a single plane, said valve body having valve means on opposite sides of the plane of said passageways and forming closure means for opposite sides of said valve body, said valve body also having duct means connecting one of said inlet passageways with one of said valve means and duct means connecting the other of said inlet passageways with the other of said valve means, additional duct means intersecting said outlet passageway connecting each of said valve means with said outlet passageway, and all of said duct means having longitudinal axes lying in planes generally perpendicular to said passageways.

References Cited in the file of this patent
UNITED STATES PATENTS

| | | |
|---|---|---|
| 1,984,999 | Stoddard | Dec. 18, 1934 |
| 2,262,290 | Kuhnle | Nov. 11, 1941 |
| 2,335,245 | Gustafson | Nov. 30, 1943 |
| 2,444,631 | Chace | July 6, 1948 |
| 2,542,279 | Kempton | Feb. 20, 1951 |